Oct. 22, 1963 W. F. MELLEN 3,107,735
TWO-WAY PLOW
Filed March 5, 1962 3 Sheets-Sheet 1

INVENTOR.
WILLIAM FISK MELLEN
BY HIS ATTORNEYS
HARRIS, KIECH, RUSSELL & KERN

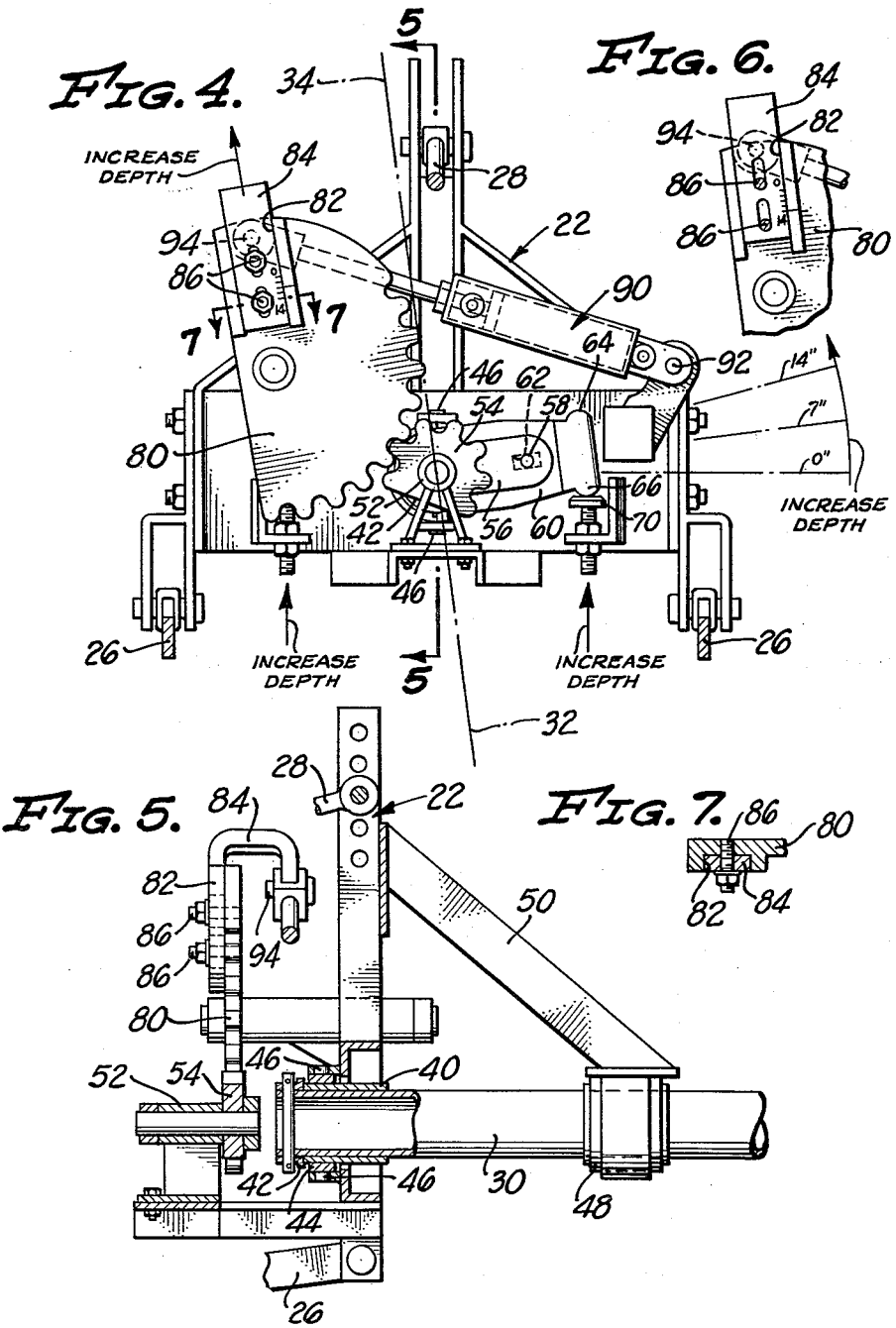

Oct. 22, 1963  W. F. MELLEN  3,107,735
TWO-WAY PLOW
Filed March 5, 1962  3 Sheets-Sheet 3
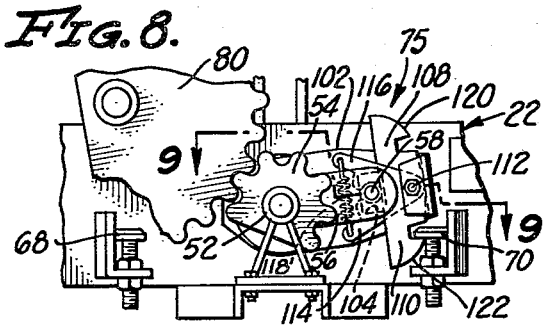
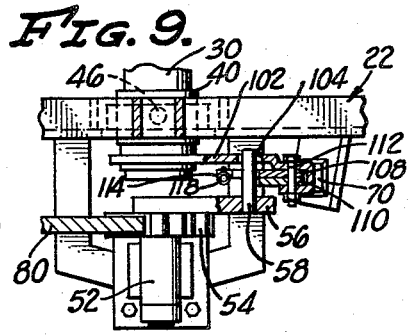
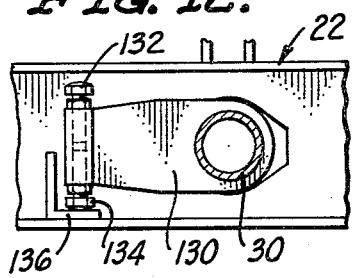
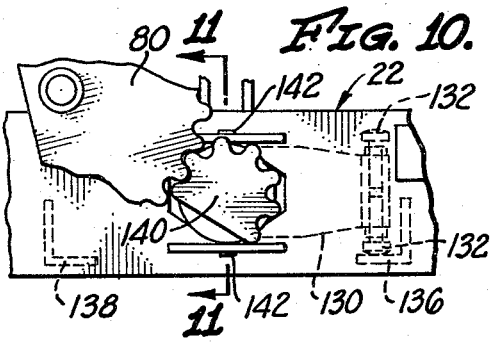
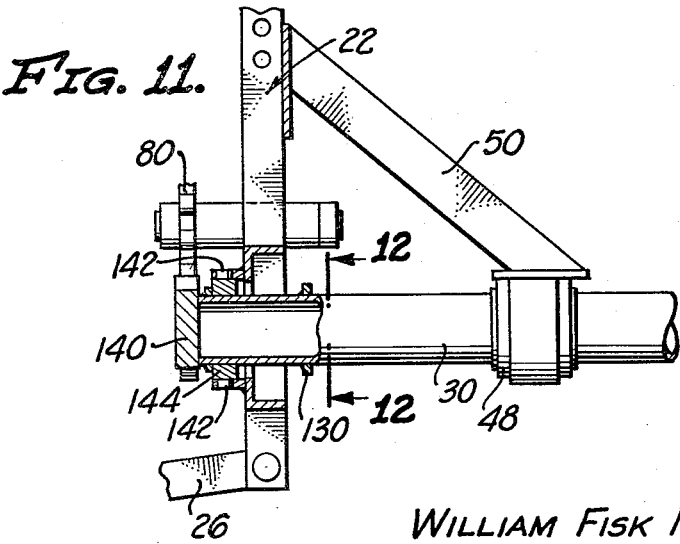
INVENTOR.
WILLIAM FISK MELLEN
BY HIS ATTORNEYS
HARRIS, KIECH, RUSSELL & KERN

United States Patent Office 3,107,735
Patented Oct. 22, 1963

3,107,735
TWO-WAY PLOW
William Fisk Mellen, Anaheim, Calif.
(P. O. Box 2032, Fullerton, Calif.)
Filed Mar. 5, 1962, Ser. No. 177,503
16 Claims. (Cl. 172—226)

The present invention relates in general to two-way plows and, more particularly, to a reversing mechanism for two-way plows.

Since the invention is particularly applicable to a two-way plow mounted on a wheel-type tractor, it will be considered in such connection herein as a matter of convenience. However, it will be understood that the invention may be utilized in other environments.

Conventionally, a two-way plow of the foregoing type includes a frame, typically an A-frame, connected to the tractor by the usual three-point hitch having means associated therewith for raising and lowering the plow. Mounted on the A-frame is a fore-and-aft plow shaft carrying two moldboard plow bottoms, or two gangs of such plow bottoms, angularly spaced 180° apart. As is well known, one gang of plow bottoms is designed to plow to the right, and the other to the left. Such a two-way plow includes a reversing mechanism for rotating the plow shaft between two angularly spaced operating positions, one gang of plow bottoms being operative in one operating position of the plow shaft and the other gang being operative in the other position thereof.

The invention contemplates an actuating means, interconnecting the A-frame and the plow shaft, for pivoting the plow shaft about its axis between its operating positions, which includes a driven gear coaxial with and operatively connected to the plow shaft, a driving gear rotatably mounted on the A-frame and meshed with the driven gear, and an extensible and contractible actuator, typically a hydraulic ram, pivotally connected at one end to the driving gear and at its other end to the A-frame. Preferably, the driving gear has a larger radius than the driven gear so that the desired angular movement of the plow shaft between its operating positions requires only a relatively small angular displacement of the driving gear. The hydraulic ram, which is of the double-acting type, is actuated by fluid under pressure supplied by a hydraulic pump conventionally provided on and driven by the tractor, the application of fluid pressure to the ram being controlled by a selector valve in the usual manner.

When a two-way plow of the foregoing character is in operation, it is essential that the particular plow bottom, or gang of plow bottoms, in use be vertically oriented, i.e., the beams carrying the plow bottoms must be vertically oriented. To achieve a vertical orientation for the gang of plow bottoms in use under various plowing conditions, the angular spacing between the two operating positions of the plow shaft, relative to the A-frame, must be variable. For example, the tractor is sometimes operated with the wheels on both sides thereof at the same level, as in plowing an initial strip across a field. Under such conditions, it is necessary to rotate the plow shaft through an angle of 180° between operating positions, or at least to rotate the plow shaft through an angle of 90° from a position intermediate the two operating positions, to achieve the necessary vertical orientation of the gang of plow bottoms. On the other hand, if the wheels on one side of the tractor are run in a previously plowed furrow, so that such wheels are at a lower level than the wheels on the other side of the tractor, the angular spacing between the operating positions must be reduced to achieve the required vertical orientation of the gang of plow bottoms in use. Also, the plowing depth requires varying the angle between the two operating positions of the plow shaft, it being apparent that the greater the depth of the previously plowed furrow in which the wheels on one side of the tractor are run, the smaller the angle between the two operating positions of the plow shaft to achieve a vertical orientation for the plow bottom, or gang of plow bottoms, in use.

With the foregoing as background, the primary object of the present invention is to provide means for so adjusting the plow-shaft actuating means that the hydraulic ram is fully extended in one operating position of the plow shaft and fully contracted in the other, the particular plow bottom, or gang of plow bottoms, in use being vertically oriented in either case.

Since, in accordance with the foregoing primary object of the invention, the hydraulic ram is either fully extended, or fully contracted, when the plow is operating, the ram cannot apply any forces to the A-frame and the driving gear. Consequently, the A-frame, and the actuating connection between the ram and the plow shaft, need not have the heavy constructions which would otherwise be required. Alternatively, no safety devices designed to yield or break under overloads are necessary. Thus, a lighter and simpler plow results, which is an important feature.

An important object of the invention is to provide means for achieving full ram extension and ram contraction in the respective operating positions of the plow shaft, which comprises means for adjusting the position of one of the ram mounts or anchor points correspondingly.

More particularly, an important object of the invention is to provide means for adjusting the position of the point of pivotal connection of the ram to the driving gear so as to achieve full extension and full contraction in the respective operating positions.

Still more specifically, an important object of the invention is to provide the driving gear with a radially adjustable slide to which one end of the ram is pivotally connected. By locking such slide in the correct radial position relative to the driving gear, the desired full extension and full contraction of the ram in the respective positions may be attained.

Since the position of the radially movable slide on the driving gear to achieve full ram extension and contraction is related to the depth of any previously plowed furrow for the reasons hereinbefore outlined, the driving gear and the radially movable slide thereon can be provided with, and an object is to provide them with, indicia showing the necessary slide setting in terms of depth.

Another object of the invention is to provide adjustable stop means for limiting the angular throw of the plow shaft from one of its operating positions to the other. Such adjustable stop means comprises a pair of stops operatively connected to the plow shaft and a corresponding pair of stops on the A-frame. Another object in this connection is to provide a construction wherein the stops of one pair are adjustable to vary the angle between the operating positions of the plow shaft, relative to the A-frame.

It will be apparent that, with the foregoing construction, only three adjustments are required in changing the angle between the two operating positions. More particularly, it is necessary only to adjust the two adjustable stops to achieve the desired angular spacing of the two operating positions, and to correspondingly adjust the radial position of the slide on the driving gear to attain full ram extension and contraction in the two operating positions. The adjustable stops may be adjusted first, and the slide may then be adjusted to achieve full ram extension, or full ram contraction, with the plow shaft in one of its operating positions, as limited by the corresponding preadjusted stop. Alternatively, the slide may be positioned radially of the driving gear initially to correspond to the depth of a previously plowed furrow. Subsequently, with the ram fully extended and fully contracted, the respective adjustable stops are adjusted into engagement with the respective fixed stops with which they cooperate. Either adjusting procedure may be used.

Another and important object of the invention is to provide means for releasably latching the plow shaft in either of its operating positions, such latch means being released automatically in response to energization of the ram in either direction.

More particularly, an object is to provide an angular-lost-motion connection between the driven gear and the plow shaft which includes means for releasing the latch means in response to limited angular movement of the driven gear relative to the plow shaft resulting from energization of the ram in either direction.

A more specific object in the foregoing connection is to provide a latch means on the plow shaft which is releasably engageable with two adjustable latch elements on the A-frame, such adjustable latch elements also acting as the adjustable stops hereinbefore discussed.

Still another important object of the invention is to provide a self-aligning plow requiring no adjustments for side draft.

More particularly, an object is to pivotally connect the plow shaft to the A-frame, for pivotal movement about an upright axis perpendicular to the axis of the plow shaft, to permit the plow to trail, and thus render it self aligning with respect to side draft variations.

A further object is to pivotally connect the plow shaft to the A-frame in the foregoing manner in a construction wherein the driven gear is operatively connected to the plow shaft by fixing it thereon, and in a construction wherein the driven gear is operatively connected to the plow shaft through a lost motion connection permitting lateral pivoting of the plow shaft without corresponding pivoting of the driven gear. In the case where the driven gear is fixed directly on the plow shaft, the upright pivot between the plow shaft and the A-frame is located as close as possible to the driven gear to minimize lateral movement of the driven gear relative to the driving gear.

The foregoing objects, advantages, features and results of the present invention, together with various other objects, advantages, features and results thereof which will be evident to those skilled in the two-way plow art in the light of this disclosure, may be attained with the exemplary embodiments of the invention described in detail hereinafter and illustrated in the accompanying drawings, wherein:

FIG. 4 is a view similar to FIG. 2, but illustrating various components in different operating positions;

FIG. 5 is a fragmentary longitudinal sectional view in a vertical plane taken as indicated by the arrowed line 5—5 of FIG. 4;

FIG. 6 is a fragmentary view duplicating a portion of FIG. 4, but showing various components in different operating positions;

FIG. 7 is a fragmentary sectional view taken along the arrowed line 7—7 of FIG. 4;

FIG. 8 is a fragmentary view similar to FIGS. 2 and 4, but illustrating another embodiment of the invention;

FIG. 9 is a fragmentary sectional view taken along the irregular arrowed line 9—9 of FIG. 8;

FIG. 10 is a fragmentary view similar to FIGS. 2, 4 and 8, but illustrating still another embodiment;

FIG. 11 is a fragmentary longitudinal sectional view in a vertical plane taken along the arrowed line 11—11 of FIG. 10; and FIG. 12 is a fragmentary transverse sectional view taken as indicated by the arrowed line 12—12 of FIG. 11 of the drawings.

*Plow 20*

Figure 1:
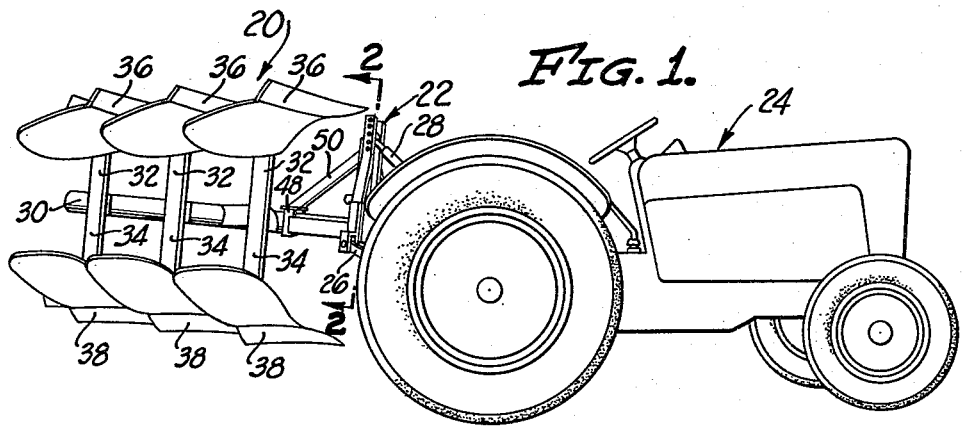
FIG. 1 is a perspective view of a tractor-mounted two-way plow which embodies the invention.

Referring initially to FIG. 1 of the drawings, the two-way plow of the invention is designated generally therein by the numeral 20 and includes an upright A-frame 22 which is shown as connected to a wheel-type tractor 24 by the usual three-point hitch. The latter includes two transversely spaced lower links 26, FIG. 2, pivotally connected to the tractor 24 at their forward ends and pivotally connected at their rearward ends to the bottom of the A-frame 22 on opposite sides thereof. The three-point hitch also includes an upper, tension link 28 pivotally connectible to the top of the A-frame 22 in various vertically spaced positions. As is conventional, the tractor 24 is provided with means, preferably hydraulic means, not shown, acting on the three-point hitch to lift the plow 20.

The two-way plow 20 includes a fore-and-aft plow shaft 30 carried by the A-frame 22 and rotatable about its axis between two operating positions angularly spaced apart a maximum of 180°, as hereinafter discussed in more detail. Mounted on the plow shaft 30 by means of beams 32 and 34 are moldboard-type, left hand and right hand plow bottoms 36 and 38 angularly spaced 180° apart. It will be understood that instead of two gangs of plow bottoms 36 and 38, two single plow bottoms may be used.

As best shown in FIG. 5 of the drawings, the forward end of the plow shaft 30 is journaled in a bearing 40 and is prevented from being pulled rearwardly out of this bearing by a thrust collar 42. On the bearing 40 is a collar 44 having thereon diametrally opposed, upright pins 46 pivotally connected to the A-frame 22 to permit lateral swinging movemen of the plow shaft 30 relative to the A-frame. The plow shaft 30 is supported rearwardly of the bearing 40 by a box-like bearing 48 connected to the A-frame 22 by a brace 50. As disclosed in more detail in my Patent No. 2,900,032, granted August 18, 1959, the box bearing 48 provides a transversely elongated opening which permits the desired lateral swinging movement of the plow shaft 30 about the upright axis provided by the pivot pins 46. With this construction, the plow 20 is rendered self aligning, as disclosed in detail in the patent mentioned.

Figure 3:
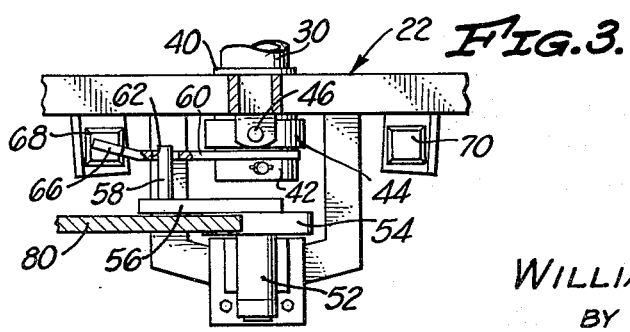
FIG. 3 is a fragmentary sectional view taken along the irregular arrowed line 3—3 of FIG. 2.

Rotatably mounted in a bearing 52 on the A-frame 22 forwardly of and in axial alignment with the plow shaft 30 is a gear, or, more accurately, a gear segment, 54 which will be referred to hereinafter as a driven gear for reasons to become apparent. As best shown in FIG. 3 of the drawings, rigidly connected to the driven gear 54 is a radial arm 56 having thereon a rearwardly extending pin 58. Fixed on the forward end of the plow shaft 30 is a radial arm 60 having therein an opening 62 for the pin 58, this opening being radially elongated to accommodate lateral swinging movement of the plow shaft 30 about the axis of the pivot pins 46. As will be apparent, the arms 56 and 60 and the pin 58 cooperate to transmit rotation of the driven gear 54 to the plow shaft 30 to pivot the latter about its axis between two operating positions wherein the plow bottoms 36 and 38, respectively, are operative.

The arm 60 on the plow shaft 30 is provided at its outer end with stops 64 and 66 respectively engageable with stops or stop pads 68 and 70 on the A-frame 22. The stops 68 and 70 are threadedly adjustable relative to the A-frame 22 to vary the angular throw of the plow shaft 30, whereby to vary the angular spacing between the operating positions of the plow 20, as will be discussed in more detail hereinafter. It might be well to point out at this juncture that the stops 68 and 70 on the A-frame 22 may also act as latch elements or pads adapted to cooperate with a releasable latch means 75, FIGS. 8 and 9, connected to the plow shaft 30 and adapted to releasably latch the plow shaft in each of the two operating positions of the plow 20. The latch means 75 will be described in detail hereinafter when considering FIGS. 8 and 9 of the drawings.

Meshed with the driven gear 54 is a driving gear, or, more accurately, a driving gear segment 80 suitably mounted on the A-frame 22 for rotation about an axis parallel to the axis of rotation of the driven gear. The radius of the driving gear 80 exceeds that of the driven gear 54 so that up to 180° of rotation of the driven gear may be achieved with a lesser angular displacement of the driving gear. For example, the ratio may be of the order of 3:1, although other ratios may be used.

The driving gear 80 is provided thereon with a radially extending guide or track 82 for a radially movable slide 84 adapted to be locked in any desired radial position by nuts threaded on studs 86 secured to the driving gear 80 and projecting through radially oriented slots in the slide 84.

The radial track 82 and the radially movable slide 84 are provided thereon with indicia designating the previously-plowed furrow depth for which the plow 20 is set with either gang of plow bottoms 36 or 38 in operation, as will be discussed in more detail hereinafter. In the particular example illustrated in the drawings, a range of furrow depths extending from zero to fourteen inches is shown. However, it will be understood that this is exemplary only and that other ranges may be utilized without departing from the spirit of the invention.

A hydraulic ram 90 interconnects the radially movable slide 84 and the A-frame 22 and is anchored thereto, respectively, at its respective ends. More particularly, the ram 90 is pivotally connected at one end to the A-frame 22 by a fixed ram mount or pivot 92 and is pivotally connected at its other end to the slide 84 by a ram mount or pivot 94, the latter pivot being radially adjustable by means of the radially movable slide 84.

The ram 90, which is of the double-acting type, is actuated by operating fluid under pressure supplied by hydraulic pumping equipment, not shown, on the tractor 24 under the control of a four-way selector valve, not shown, as is well known in the art.

*Operation of Plow 20*

In considering the operation of the two-way plow 20, it will be assumed initially that a previously plowed furrow exists in which the wheels on one side or the other of the tractor 24 will be run, depending on whether it is necessary to plow to the left or the right. It will be assumed also that the depth of the previously plowed furrow corresponds to the desired plowing depth.

Figure 2:
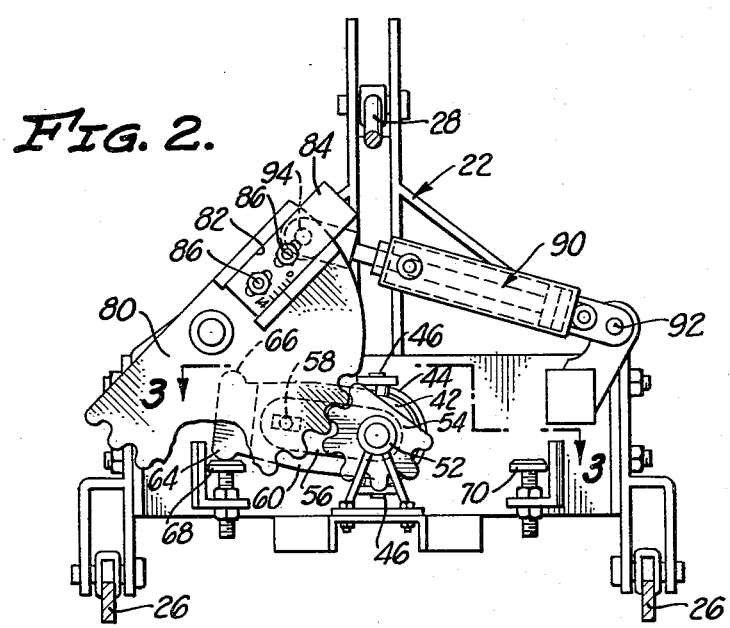
FIG. 2 is an enlarged, fragmentary, transverse sectional view taken along the arrowed line 2—2 of FIG. 1.

Under the foregoing conditions, it is merely necessary to adjust the slide 84 radially of the driving gear 80 to the desired plowing depth, and to correspondingly adjust the stops 68 and 70 so that the ram 90 is fully contracted when the stop 64 is in engagement with the stop 68, as shown in FIG. 2, and is fully extended when the stop 66 is in engagement with the stop 70, as shown in FIG. 4. Once the slide 84 and the stops 68 and 70 have been adjusted in this manner, the plow beams 32 or 34 will automatically be vertically oriented when the corresponding plow bottoms 36 or 38 are lowered into the ground and the wheels on the corresponding side of the tractor are in the previously plowed furrow. At the same time, the ram 90 will be fully extended, or fully contracted, as the case may be. Consequently, even though pressure is maintained on the ram, no overstroking can occur to impose undesirable loads on the A-frame 22, the driving and driven gears 80 and 54, and the like. This is an important feature since it permits the use of a lighter weight construction throughout, and avoids any necessity for such safety devices as overload springs, shear pins, or the like.

Throughout FIGS. 1 to 7 of the drawings, and particularly in FIGS. 2 and 4 thereof, the radially movable slide 84 and the stops 68 and 70 are shown adjusted to positions corresponding to what has arbitrarily been designated as a furrow depth of seven inches for purposes of illustration. To accommodate an increased furrow depth, it is merely necessary to adjust the slide 84 and the stops 68 and 70 in the directions indicated by the corresponding arrows labeled "Increase Depth." In FIG. 6 of the drawings, the slide 84 is shown adjusted to what is arbitrarily designated as a fourteen-inch furrow depth for illustrative purposes. When the stops 68 and 70 are correspondingly adjusted, the angular throw of the plow shaft 30 between its two operating positions is reduced, and the stop arm 60 on the plow shaft will assume a position relative to the A-frame 22 along the fourteen-inch radial line appearing on the right hand side of FIG. 4 of the drawings. Under such conditions, when plowing with the wheels on one side of the tractor 24 in a previously plowed fourteen-inch furrow, the plow beams 32 or 34 will automatically assume vertical orientations to vertically orient the corresponding plow bottoms 36 and 38. Also, the ram 90 will be fully contracted, or fully extended, when the plow beams 34 or 32 are in their vertical positions. Again, with the correct corresponding adjustments of the slide 84 and the stops 68 and 70, this occurs automatically with no attention on the part of the operator of the tractor 24. Thus, overstroking of the ram 90 is prevented to eliminate any possibility of damage to various parts of the plow 20.

It should perhaps be further explained that the so-called depth indicia on the track 82 and the slide 84 do not necessarily indicate the actual plowing depth. What they do indicate is the setting of the slide 84 necessary to achieve vertical orientation of the plow beams 32 or 34 when the wheels on the corresponding side of the tractor 24 are running in a previously plowed furrow of corresponding depth. Thus, when running in a previously plowed furrow seven inches deep, the slide 84 is correspondingly set, and the stops 68 and 70 are set to provide full ram contraction and extension for such setting of the slide 84. The actual plowing depth will depend on the extent to which the plow 20 is lowered, the plow preferably being lowered to the same plowing depth, e.g., seven inches, to maintain constant conditions for repeated traverses of the field in alternately opposite directions.

Thus, the indicia on the track 82 and the slide 84 are indicative only of the settings necessary to correspond to the depth of a previously plowed furrow. If the previously plowed furrow is fourteen inches deep, the "14" setting is used for the slide 84. If there is no previous furrow to run in, the "0" indicium is used in setting the slide 84, the actual plowing depth then depending upon the extent to which the plow 20 is lowered.

It will also be understood that the adjustments of the slide 84 and the stops 68 and 70 may be made in different sequences. As previously outlined, the slide 84 may be adjusted first, and the stops 68 and 70 subsequently adjusted to positions corresponding to full ram contraction and extension, respectively. Alternatively, the stops 68 and 70 may be adjusted first to provide the angular throw of the plow shaft 30 corresponding to a particular furrow depth, and the slide 84 subsequently adjusted to provide full ram extension, or full ram contraction, with the plow shaft 30 in its corresponding operating position.

When there is no previously plowed furrow available, as in making the first traverse across a field, it is necessary to set the stops 68 and 70 to provide an angular spacing of 180° between the operating positions of the plow shaft 30, this being required to achieve the necessary vertical orientation of the plow bottoms 36 or 38 to be used. The slide 84 is correspondingly adjusted to provide full ram extension and contraction in the respective limiting positions of the plow shaft 30. Under such conditions, the indicia on the slide 84 and the track 82 will indicate a zero depth for the previous furrow, the desired plowing depth being achieved by lowering the plow 20, with the three-point hitch described, to the extent necessary. In order to maintain the beams 32 or 34 of the particular plow bottoms 36 or 38 in service vertically oriented when viewed from the side, the length of the upper link 28 of the three-point hitch is correspondingly shortened, as is conventional.

It will be understood that while the two-way plow 20 has been described as provided with a laterally swingable plow shaft 30 to render it self aligning, the plow shaft may also be laterally fixed. In the former case, the plow 20 is more nearly fully automatic, no adjustments for side draft being necessary. In the latter case, side draft adjustments are required, such adjustments being well known.

FIGS. 8 and 9

Turning now to FIGS. 8 and 9 of the drawings for a consideration of the hereinbefore-referred-to latch means 75, this latch means serves to releasably lock the plow shaft 30 in either of its operating positions, being engageable with the stop 68 or the stop 70, which serve as latch elements in this instance. With this construction, the plow 20 is positively locked in the particular operating position in which it is placed, the ram 90 being fully extended or contracted when the plow beams 32 or 34 are vertical, as before. With the plow 20 locked in one or the other of its operating positions, there is no need to maintain fluid pressure on the ram 90 once the desired operating position is reached.

Considering the latch means 75 in more detail, it includes a radial arm 102 on the plow shaft 30 which corresponds to the previously described arm 60, opposite sides of the outer end of such arm being engageable with the stops 68 and 70, respectively. The pin 58 on the arm 56 connected to the driven gear 54 projects rearwardly into an opening 104 in the arm 102 which is radially enlarged to compensate for lateral swinging of the plow shaft 30 about the axis of the pivot pins 46, as hereinbefore explained. The opening 104 is also enlarged circumferentially to provide, in effect, an angular-lost-motion connection, or connecting means between the driven gear 54 and the plow shaft 30. This angular lost motion is utilized to release the latch means 75, as will now be described.

The latch means 75 includes two latch elements 108 and 110 respectively provided with notches respectively adapted to receive therein the stops or latch elements 68 and 70, the latter having the form of heads or pads on threaded studs. The latch elements 108 and 110 are pivotally mounted on the arm 102 at 112 and have radially-inwardly-extending arms 114 and 116 which are biased toward each other by a tension spring 118 and which receive the pin 58 therebetween.

As will be apparent, if the driven gear 54 is rotated in the counterclockwise direction, as viewed in FIG. 8, the arm 56 connected to the driven gear rotates relative to the arm 102 connected to the plow shaft 30 to permit the pin 58 to engage the latch-element arm 116 and pivot the latch element 110 out of engagement with the stop or latch element 70. At the end of the angular-lost-motion connection between the arms 56 and 102, the pin 58 engages the corresponding end of the opening 104 to transmit further rotation of the driven gear 54 to the plow shaft 30. The latch element 108 is disengaged from the stop or latch element 68 in a similar, but reversed, manner. Thus, the angular-lost-motion connection between the arm 56 and the arm 102 is utilized to release the latch means 75 in either direction of rotation on the driven gear 54, prior to initiating rotation of the plow shaft 30 from one of its operating positions to the other.

Latching engagement of the latch elements 108 and 110 with the respective stops 68 and 70 occurs automatically, the latch elements 108 and 110 being provided with cam surfaces 120 and 122, respectively, for this purpose.

FIGS. 10 to 12

In these figures of the drawings is shown an alternative embodiment of the invention which includes a somewhat different form of stop means for preventing pivotal movement of the plow shaft 30 beyond its operating positions. In this instance, the plow shaft 30 is provided thereon with a radial arm 130 having thereon two stops 132 and 134 respectively engageable with stops 136 and 138 on the A-frame 22. In this instance, the stops 132 and 134 are threadedly adjustable to vary the angular throw of the plow shaft 30, whereas the stops 136 and 138 are fixed.

Another difference in this embodiment is that the plow shaft 30 has rigidly connected thereto a driven gear 140 corresponding to the driven gear 54 and meshed with the driving gear 80. The plow shaft 30 is mounted for lateral swinging movement about an upright pivot axis provided by diametrally opposed pins 142 carried by a bearing 144 for the plow shaft and pivotally engaging the A-frame 22. As previously explained, the purpose of the pivotal connection provided by the pivot pins 142 is to permit self alignment of the plow.

The pivot axis provided by the pivot pins 142 is located closely adjacent the driven gear 140 so as to minimize lateral movement of the driven gear toward and away from the driving gear 80. Also, the driven gear 140 is thickened to insure that it will remain in mesh with the driving gear 80 despite cocking of the driven gear relative to the driving gear as the plow shaft 30 swings back and forth laterally. It will be understood that the angle of lateral swing of the plow shaft 30 is relatively small so that, by locating the pivot pins 142 close to the driven gear 140 and by thickening the driven gear, proper meshing engagement of the driving gear 80 and the driven gear will be maintained even though there is some relative lateral movement and relative cocking movement therebetween. With this construction, it is unnecessary to provide the indirect operative connection between the driven gear 54 and the plow shaft 30 which was described previously.

Although exemplary embodiments of the invention have been described herein for purposes of illustration, it will be understood that various changes, modifications and substitutions may be incorporated in such embodiments without departing from the spirit of the invention as defined by the claims which follow.

I claim:

1. In a two-way plow, or the like, the combination of:
   (a) a frame;
   (b) a shaft;
   (c) means connecting said shaft to said frame for pivotal movement of said shaft about its axis between angularly spaced operating positions;
   (d) a driven gear coaxial with said shaft;
   (e) means operatively connecting said driven gear to said shaft;
   (f) a driving gear rotatably mounted on said frame and meshed with said driven gear;
   (g) a ram;
   (h) a fixed ram mount pivotally connecting one end of said ram to said frame; and
   (i) means for pivotally connecting the other end of said ram directly to said driving gear varying distances from the axis of rotation thereof so as to provide for full extension and full contraction of said ram when said shaft is in said operating positions, respectively.

2. In a two-way plow, or the like, the combination of:
   (a) a frame;
   (b) a shaft;
   (c) means connecting said shaft to said frame for pivotal movement of said shaft about its axis between angularly spaced operating positions;
   (d) a driven gear coaxial with said shaft;

(e) means operatively connecting said driven gear to said shaft;
(f) a driving gear rotatably mounted on said frame and meshed with said driven gear;
(g) a ram;
(h) a fixed ram mount pivotally connecting one end of said ram to said frame;
(i) a slide mounted on said driving gear and movable radially thereof relative to its axis of rotation;
(j) a movable ram mount pivotally connecting the other end of said ram to said slide; and
(k) means for locking said slide relative to said driving gear.

3. In a two-way plow, or the like, the combination of:
(a) a frame;
(b) a shaft;
(c) means connecting said shaft to said frame for pivotal movement of said shaft about its axis between angularly spaced operating positions;
(d) a driven gear coaxial with said shaft;
(e) means operatively connecting said driven gear to said shaft;
(f) a driving gear rotatably mounted on said frame and meshed with said driven gear;
(g) a ram;
(h) a fixed ram mount pivotally connecting one end of said ram to said frame;
(i) a slide mounted on said driving gear and movable radially thereof relative to its axis of rotation;
(j) a movable ram mount pivotally connecting the other end of said ram to said slide;
(k) means for locking said slide relative to said driving gear; and
(l) two locking means for locking said shaft in said operating positions, respectively.

4. In a two-way plow, or the like, the combination of:
(a) a frame;
(b) a shaft;
(c) means connecting said shaft to said frame for pivotal movement of said shaft about its axis between angularly spaced operating positions;
(d) a driven gear coaxial with said shaft;
(e) means operatively connecting said driven gear to said shaft;
(f) a driving gear rotatably mounted on said frame and meshed with said driven gear;
(g) a ram;
(h) a fixed ram mount pivotally connecting one end of said ram to said frame;
(i) a slide mounted on said driving gear and movable radially thereof relative to its axis of rotation;
(j) a movable ram mount pivotally connecting the other end of said ram to said slide;
(k) means for locking said slide relative to said driving gear; and
(l) two stop means for preventing pivotal movement of said shaft beyond said operating positions, respectively.

5. In a two-way plow, or the like, the combination of:
(a) a frame;
(b) a shaft;
(c) means connecting said shaft to said frame for pivotal movement of said shaft about its axis between angularly spaced operating positions;
(d) a driven gear coaxial with said shaft;
(e) means operatively connecting said driven gear to said shaft;
(f) a driving gear rotatably mounted on said frame and meshed with said driven gear;
(g) a ram;
(h) a fixed ram mount pivotally connecting one end of said ram to said frame;
(i) a slide mounted on said driving gear and movable radially thereof relative to its axis of rotation;
(j) a movable ram mount pivotally connecting the other end of said ram to said slide;
(k) means for locking said slide relative to said driving gear;
(l) two locking means for locking said shaft in said operating positions, respectively; and
(m) two stop means for preventing pivotal movement of said shaft beyond said operating positions, respectively.

6. In a two-way plow, or the like, the combination of:
(a) a frame;
(b) a shaft;
(c) means connecting said shaft to said frame for pivotal movement of said shaft about its axis between angularly spaced operating positions;
(d) a driven gear coaxial with said shaft;
(e) means operatively connecting said driven gear to said shaft;
(f) a driving gear rotatably mounted on said frame and meshed with said driven gear;
(g) a ram;
(h) a fixed ram mount pivotally connecting one end of said ram to said frame;
(i) a slide mounted on said driving gear and movable radially thereof relative to its axis of rotation;
(j) a movable ram mount pivotally connecting the other end of said ram to said slide;
(k) means for locking said slide relative to said driving gear; and
(l) means connecting said shaft to said frame for pivotal movement of said shaft relative to said frame about an axis perpendicular to the axis of said shaft.

7. In a two-way plow, or the like, the combination of:
(a) a frame;
(b) a shaft;
(c) means connecting said shaft to said frame for pivotal movement of said shaft about its axis between angularly spaced operating positions;
(d) a driven gear coaxial with said shaft;
(e) means operatively connecting said driven gear to said shaft;
(f) a driving gear rotatably mounted on said frame and meshed with said driven gear;
(g) a ram;
(h) a fixed ram mount pivotally connecting one end of said ram to said frame;
(i) a slide mounted on said driving gear and movable radially thereof relative to its axis of rotation;
(j) a movable ram mount pivotally connecting the other end of said ram to said slide;
(k) means for locking said slide relative to said driving gear;
(l) a first pair of stops operatively connected to said shaft;
(m) a second pair of stops on said frame and engageable by said stops of said first pair, respectively, to prevent pivotal movement of said shaft beyond said operating positions, respectively; and
(n) said stops of one of said pairs being adjustable to vary the angular spacing between said operating positions of said shaft.

8. In a two-way plow, or the like, the combination of:
(a) a frame;
(b) a shaft;
(c) means connecting said shaft to said frame for pivotal movement of said shaft about its axis between angularly spaced operating positions;
(d) a driven gear coaxial with and mounted on said shaft;
(e) a driving gear rotatably mounted on said frame and meshed with said driven gear;
(f) a ram;
(g) a fixed ram mount pivotally connecting one end of said ram to said frame;
(h) a slide mounted on said driving gear and movable radially thereof relative to its axis of rotation;

(i) a movable ram mount pivotally connecting the other end of said ram to said slide; and (j) means for locking said slide relative to said driving gear.

9. In a two-way plow, or the like, the combination of:
(a) a frame;
(b) a shaft;
(c) means connecting said shaft to said frame for pivotal movement of said shaft about its axis between angularly spaced operating positions;
(d) a driven gear coaxial with and mounted on said shaft;
(e) a driving gear rotatably mounted on said frame and meshed with said driven gear;
(f) a ram;
(g) a ram mount pivotally connecting one end of said ram to said frame;
(h) means pivotally connecting the other end of said ram to said driving gear; and
(i) means connecting said shaft to said frame for pivotal movement of said shaft relative to said frame about an axis perpendicular to the axis of said shaft and adjacent said driven gear.

10. In a two-way plow, or the like, the combination of:
(a) a frame;
(b) a shaft;
(c) means connecting said shaft to said frame for pivotal movement of said shaft about its axis between angularly spaced operating positions;
(d) a driven gear rotatably mounted on said frame and coaxial with said shaft;
(e) means providing an angular-lost-motion connection between said driven gear and said shaft;
(f) a driving gear rotatably mounted on said frame and meshed with said driven gear;
(g) a ram;
(h) a fixed ram mount pivotally connecting one end of said ram to said frame;
(i) a slide mounted on said driving gear and movable radially thereof relative to its axis of rotation;
(j) a movable ram mount pivotally connecting the other end of said ram to said slide; and
(k) means for locking said slide relative to said driving gear.

11. In a two-way plow, or the like, the combination of:
(a) a frame;
(b) a shaft;
(c) means connecting said shaft to said frame for pivotal movement of said shaft about its axis between angularly spaced operating positions;
(d) a driven gear rotatably mounted on said frame and coaxial with said shaft;
(e) means providing an angular-lost-motion connection between said driven gear and said shaft;
(f) a driving gear rotatably mounted on said frame and meshed with said driven gear;
(g) a ram;
(h) a fixed ram mount pivotally connecting one end of said ram to said frame;
(i) a slide mounted on said driving gear and movable radially thereof relative to its axis of rotation;
(j) a movable ram mount pivotally connecting the other end of said ram to said slide;
(k) means for locking said slide relative to said driving gear;
(l) two latch elements on said frame and angularly spaced apart relative to the axis of said shaft;
(m) releasable latch means on said shaft and engageable with said latch elements, respectively, in latching relation when said shaft is in said operating positions, respectively; and
(n) said angular-lost-motion connection between said driven gear and said shaft including means for unlatching said latch means from said latch elements, respectively, in response to limited angular movement of said driven gear relative to said shaft in directions to tend to pivot said shaft away from said operating positions, respectively.

12. In a two-way plow, or the like, the combination of:
(a) a frame;
(b) a shaft;
(c) means connecting said shaft to said frame for pivotal movement of said shaft about its axis between angularly spaced operating positions;
(d) a driven gear rotatably mounted on said frame and coaxial with said shaft;
(e) means providing an angular-lost-motion connection between said driven gear and said shaft;
(f) a driving gear rotatably mounted on said frame and meshed with said driven gear;
(g) a ram;
(h) a fixed ram mount pivotally connecting one end of said ram to said frame;
(i) a slide mounted on said driving gear and movable radially thereof relative to its axis of rotation;
(j) a movable ram mount pivotally connecting the other end of said ram to said slide;
(k) means for locking said slide relative to said driving gear;
(l) two adjustable latch elements on said frame and angularly spaced apart relative to the axis of said shaft;
(m) releasable latch means on said shaft and engageable with said latch elements, respectively, in latching relation when said shaft is in said operating positions, respectively;
(n) said angular-lost-motion connection between said driven gear and said shaft including means for unlatching said latch means from said latch elements, respectively, in response to limited angular movement of said driven gear relative to said shaft in directions to tend to pivot said shaft away from said operating positions, respectively; and
(o) means for adjusting said latch elements to vary the angular spacing between said operating positions of said shaft.

13. In a two-way plow, or the like, the combination of:
(a) a frame;
(b) a shaft;
(c) means conecting said shaft to said frame for pivotal movement of said shaft about its axis betwen angularly spaced operating positons;
(d) a driven gear rotatably mounted on said frame and coaxial with said shaft;
(e) means providing an angular-lost-motion connection between said driven gear and said shaft;
(f) means for rotating said driven gear;
(g) two latch elements on said frame and angularly spaced apart relative to the axis of said shaft;
(h) releasable latch means on said shaft and engageable with said latch elements, respectively, in latching relation when said shaft is in said operating positions, respectively; and
(i) said angular-lost-motion connection between said driven gear and said shaft including means for unlatching said latch means from said latch elements, respectively, in response to limited angular movement of said driven gear relative to said shaft in directions to tend to pivot said shaft away from said operating positions, respectively.

14. In a two-way plow, or the like, the combination of:
(a) a frame;
(b) a shaft;
(c) means connecting said shaft to said frame for pivotal movement of said shaft about its axis between angularly spaced operating positions;
(d) actuating means connected to said frame and said shaft for pivoting said shaft about its axis between said operating positions;
(e) said actuating means including an extensible and contractible actuator and two actuator mounts one connected to said frame and anchoring one end of said actuator and the other connected to said shaft and anchoring the other end of said actuator;
(f) means for producing full extension and full contraction of said actuator when said shaft is in said operating positions, respectively; and
(g) the means of subparagraph (f) including means for varying the position of one of said actuator mounts.

15. In a two-way plow, or the like, the combination of:
(a) a frame;
(b) a shaft;
(c) means connecting said shaft to said frame for pivotal movement of said shaft about its axis between anguarly spaced operating positions;
(d) actuating means connected to said frame and said shaft for pivoting said shaft about its axis between said operating positions;
(e) said actuating means including an extensible and contractible actuator and two actuator mounts one connected to said frame and anchoring one end of said actuator and the other connected to said shaft and anchoring the other end of said actuator;
(f) means for producing full extension and full contraction of said actuator when said shaft is in said operating positions, respectively;
(g) the means of subparagraph (f) including means for varying the position of one of said actuator mounts; and
(h) two adjustable stop means for preventing pivotal movement of said shaft beyond said operating positions, respectively.

16. In a two-way plow, or the like, the combination of:
(a) a frame;
(b) a shaft;
(c) means connecting said shaft to said frame for pivotal movement of said shaft about its axis between anguarly spaced operating positions;
(d) a driven gear coaxial with said shaft;
(e) means operatively connecting said driven gear to said shaft;
(f) a driving gear rotatably mounted on said frame and meshed with said driven gear;
(g) a ram;
(h) a fixed ram mount pivotally connecting one end of said ram of to said frame;
(i) a slide mounted on said driving gear and movable radially thereof relative to its axis of rotation; and
(j) a movable ram mount pivotally connecting the other end of said ram to said slide.

References Cited in the file of this patent
UNITED STATES PATENTS 2,807,200    Pursche _____ Sept. 24, 1957

FOREIGN PATENTS 701,603    Great Britain _____ Dec. 30, 1953
585,625    Italy _____ Nov. 25, 1958